(No Model.)
L. B. OHLIGER.
WASTE PIPE COUPLING.
No. 262,310. Patented Aug. 8, 1882.
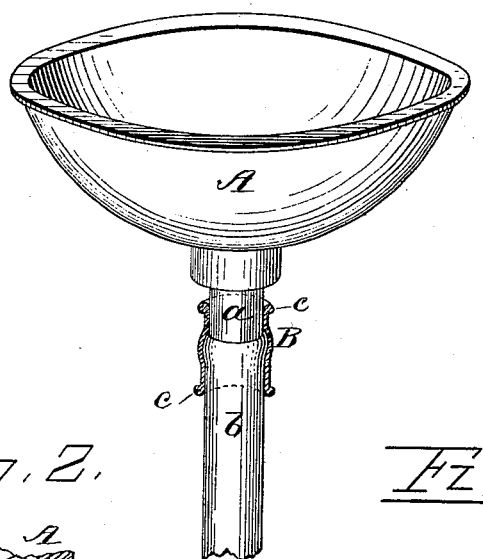
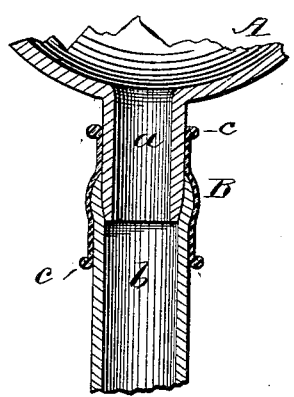
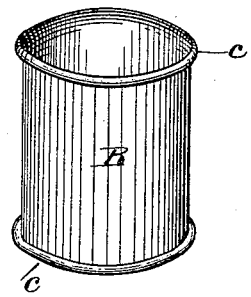
WITNESSES
Franck L. Durand
Wm L. Speiden
INVENTOR
Louis B. Ohliger
By his Attorneys
Charles H. Roberts & Fred W. Bond

United States Patent Office.

LOUIS B. OHLIGER, OF CANTON, OHIO, ASSIGNOR OF TWO-THIRDS TO HARRY FIFE AND THEOBOLD & CO., OF SAME PLACE.

WASTE-PIPE COUPLING.

SPECIFICATION forming part of Letters Patent No. 262,310, dated August 8, 1882.

Application filed March 20, 1882. (No model.)

*To all whom it may concern:*

Be it known that I, LOUIS B. OHLIGER, a citizen of the United States, residing at Canton, in the county of Stark and State of Ohio, have invented certain new and useful Improvements in Waste-Pipe Couplings; and I do hereby declare that the following is a full, clear, and exact description of the same, reference being had to the annexed drawings, making a part of this specification, and to the letters and figures of reference marked thereon.

Figure 1 of the drawings is a perspective view of a wash-basin, showing the application of my rubber coupling-sleeve. Fig. 2 is a sectional elevation thereof, and Fig. 3, a detail view, in perspective, of the rubber coupling-sleeve.

The present invention has relation to that class of couplings for pipes composed of a short section of rubber or an elastic sleeve or tube.

The rubber tubes or pipe-couplings to which the invention more nearly relates consist of a coupling composed of rubber, the two halves of which were of different diameters, having beads around their ends. These couplings were adapted only for use in a certain class of pipes; and the object therefore of the present invention is to provide such a coupling that will be simple in construction and can be manufactured at a small cost, and in place of forming it of two halves of different internal diameters I form it of a single section or piece of tubing of equal internal diameter throughout its length, with beads at its ends for convenience of placing it over the ends of the pipes or removing it therefrom as required.

In the accompanying drawings, A represents a wash-basin having the usual short section, *a*, of pipe for connecting thereto the ordinary waste-pipe, *b*. The rubber sleeve B, which couples the pipes *a b* together, is molded with annular beads *c* at both its ends, as shown in Fig. 3, which enables the sleeve to be rolled up and unrolled over the ends of the pipe with ease and facility. The rubber coupling-sleeve B is equally applicable to urinals, sinks, and as a means for coupling all class of pipes where such a coupling is found useful, but is more particularly intended for wash-basins and urinals, the elasticity of the rubber allowing the basin or urinal to settle, this being the purpose of the short section of rubber tube or hose heretofore referred to.

Having now fully described my invention, what I claim as new, and desire to secure by Letters Patent, is—

As an improved article of manufacture, a pipe-coupling consisting of the sleeve B, composed of a single section of rubber tube of equal internal diameter throughout its length, and having beads around each end, substantially as and for the purpose set forth.

In testimony that I claim the above I have hereunto subscribed my name in the presence of two witnesses.

LOUIS B. OHLIGER.

Witnesses:
  FRED. W. BOND,
  HARRY E. FIFE.